Nov. 28, 1961 M. M. DORENBOSCH ET AL 3,011,060
X-RAY SPECTROGRAPH
Filed Jan. 31, 1958 2 Sheets-Sheet 1

INVENTORS
MATTHEW M. DORENBOSCH
BY P. WILLIAM ZINGARO

AGENT

Nov. 28, 1961   M. M. DORENBOSCH ET AL   3,011,060
X-RAY SPECTROGRAPH
Filed Jan. 31, 1958   2 Sheets-Sheet 2

INVENTORS
MATTHEW M. DORENBOSCH
P. WILLIAM ZINGARO
BY
AGENT.

United States Patent Office 3,011,060
Patented Nov. 28, 1961

3,011,060
X-RAY SPECTROGRAPH
Matthew M. Dorenbosch, New Rochelle, and Placido William Zingaro, Hartsdale, N.Y., assignors to Philips Electronics, Inc., New York, N.Y., a corporation of Delaware
Filed Jan. 31, 1958, Ser. No. 712,443
14 Claims. (Cl. 250—83.6)

Our invention relates to X-ray spectrographs, to detectors for X-ray spectrographs, and to methods of determining the composition of materials with an X-ray spectrograph.

It is known that X-rays may be employed to determine the elemental composition as well as crystal structure of materials. Because analysis of materials by X-rays is non-destructive, methods and devices for determining the elemental composition and crystalline structure of matter have been developed extensively. Particularly, in the field of elemental analysis, in which a specimen of material is excited into producing its characteristic X-rays, a device known as the X-ray spectrograph has been developed.

A specimen of material may be excited into producing characteristic radiation in either of two ways. The specimen may be exposed to relatively intense monochromatic X-radiation or continuous spectrum X-radiation having a wave-length shorter than an absorption edge of an element in the material which causes that element to generate characteristic secondary X-rays or fluorescent X-radiation. Or, the specimen may be exposed to electrons having enough energy to produce characteristic radiation from the element in the specimen. In either case, the characteristic radiation produced by the element in the sample must be detected in order to identify the element and, by comparison with a standard sample containing a known quantity of that element, to determine the quantity of the element in the original specimen.

In view of the simplicity in using X-rays to excite the element in the specimen, it has become more widespread to expose the specimen to X-rays generated by an X-ray tube or to emanations of a radioactive material and thus produce characteristic fluorescent radiation. This fluorescent radiation is free of the continuous spectrum or background radiation inherent in X-rays generated by an electron beam striking a target but is much less intense. Consequently, more efficient and sensitive detectors must be employed.

By special techniques such as using a low absorption path, for example helium, between the specimen and the detector and using extremely thin windows, made of beryllium, for the detector it has been possible to detect characteristic radiation produced by the element magnesium (atomic No. 12). Although sodium (atomic No. 11) in significant quantities has been detected in this manner, the lowest element that can be detected with certainty in this manner appears now to be magnesium. Obviously, a number of elements lower than magnesium exist in abundance in many materials whose composition it is desired to determine. Elements such as boron (atomic No. 5), nitrogen (atomic No. 7) and oxygen (atomic No. 8) defy analysis by X-rays with present instrumentation because the wave-lengths of their characteristic rays are so long that they would be completely absorbed before reaching a detector, even in a helium path with a very thin window detector.

A principal object of our invention is to provide a novel spectrograph designed primarily to detect low atomic number elements.

A further object of our invention is to provide a novel method of determining the elemental composition of a specimen of material.

A still further object of our invention is to extend the range of elements which can be found in a specimen of material.

Another object of our invention is to provide a novel detector capable of detecting long wave-length X-radiation.

These and further objects of our invention will appear as the specification progresses.

When a specimen of material is exposed to X-rays, radioactive emanations, or high-energy electrons, X-rays are generated by elements within the material which can be detected by Geiger-Müller counters, proportional counters, photographic plates or devices sensitive to X-radiation. These X-rays issue in all directions only a portion of which reach a conventional detector or photographic plate.

In accordance with our invention, we have made a detector in the form of an annulus or toroid having a central opening or aperture whose diameter is small compared with the diameter of the annulus. Mounted centrally within the annulus is an anode wire suspended by insulators from the wall of the annulus which serves as the cathode. The annulus is filled with an ionizable gas and a suitable high voltage connection is made to the central wire through the wall of the annulus. A window is provided in the bottom wall of the annulus for radiation to enter the detector. In consequence thereof, a more uniform field can be maintained in the gas volume and higher counting efficiency can be obtained.

In a preferred embodiment of our invention, provision is made to dispose the specimen entirely within the counter. As a result, the detector operates in effect without a window which would intercept relatively soft X-radiation, i.e. radiation having wave-lengths greater than about five Angstrom, permitting the detection of elements of low atomic numbers, i.e. below atomic No. 20, with an efficiency comparable to that obtainable with conventional detectors for higher atomic number elements.

The invention will be described with reference to the drawing accompanying this specification and in which.

Figure 1:
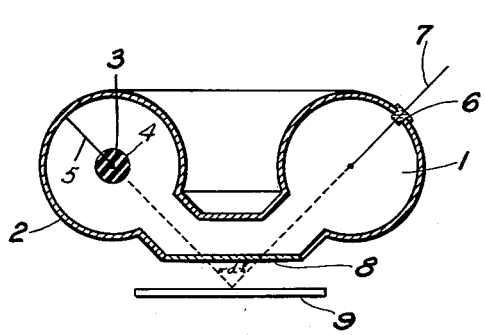
FIG. 1 is a front elevational view in section of a counter according to the invention.
Figure 2:
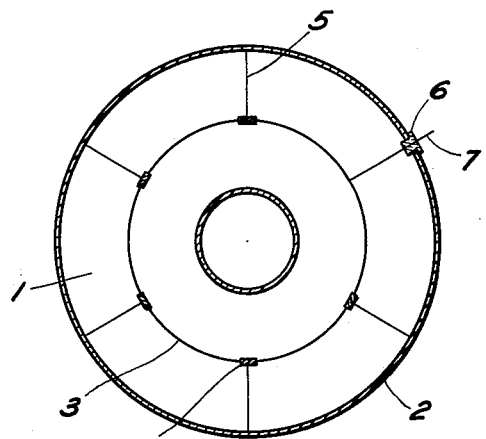
FIG. 2 is a plan view of the chamber in FIG. 1.

Referring to the drawing, the counter, shown in sectional elevation in FIG. 1, includes a hollow toroidal or annular chamber 1 formed by a tubular toroidal body the wall 2 of which constitutes the cathode of the counter. The wall may be made of metal and grounded or it may be made of an insulating material, the inner surface of which is coated with an electrically conductive material, such as silver, or graphite. Concentric with the annulus is a wire 3 (see FIG. 2) supported by insulators 4 attached to the wall through guides 5, which may be rigid metal members or preferably, insulating spiders. A high-voltage connection is made to the anode through an insulator 6 in the wall of the annulus by a conductor 7.

A window 8 is provided in the lower portion of the annulus to permit X-radiation emanating from a specimen 9 to enter the detector. As can be seen readily from the drawing, the solid angle of radiation that enters the detector is substantially larger than that which can enter a conventional detector parallel to its longitudinal axis. The detector is filled with ionizable medium such as argon, neon, krypton or helium to which a small amount of a quenching agent has been added. As such gaseous fillings and quenching agents are well-known in this art, no detailed list will be provided and the reader is referred to such texts which do provide lists of suitable gaseous mediums. For reasons which will appear in detail hereinafter, however, we prefer a mixture of helium and isopropyl alcohol.

Figure 3:
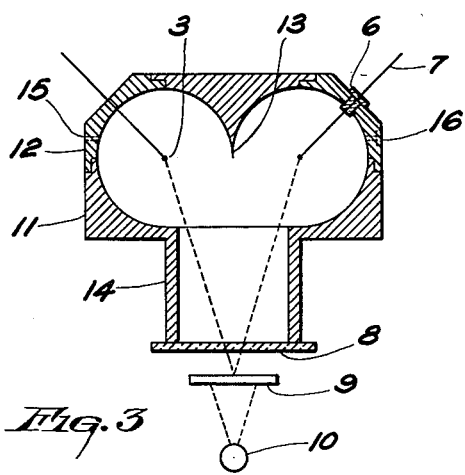
FIG. 3 is a front elevational view, in section, of another embodiment of the counter.

Another construction of the counter is shown in FIG. 3. In certain cases, it may be desirable to eliminate all or substantially all radiation other than that emanating from the specimen from entering the counter. For example, if the specimen is exposed to radiation from an X-ray tube or radioactive source 10, it may be desirable to shield the source of X-rays or radioactive emanations and prevent those rays from entering the counter. In the construction shown, the annular chamber has been formed in a body, which may consist of two machined or cast sections 11 and 12, fitted together to form a single body. A significant feature of this construction is the juncture 13 of the inner walls to eliminate the central opening of the annulus. In addition, a tubular extension 14 of the outer wall of the annulus provides a collimator for limiting the radiation entering the counter to that emanating from the specimen.

In addition, this construction provides an orifice 15 for introducing additional gas into the counter for any that may be lost by leakage or exhausted through a similar orifice 16.

Figure 4:
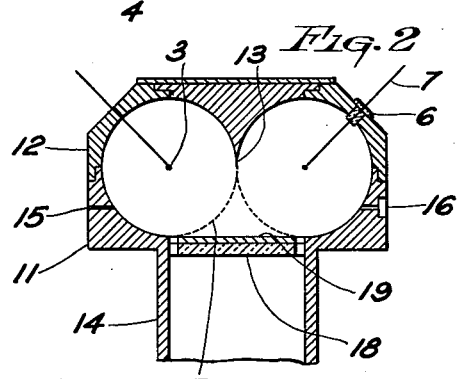
FIG. 4 is a front elevational view, in section, of still another embodiment of the counter.

FIG. 4 shows a modification of the construction shown in FIG. 3. In the embodiments shown in FIGS. 1 and 3 there is a gap in the wall of the annulus in order that X-radiation may enter the active gas volume of the counter surrounding the anode wire. In order to create a uniform field about the anode wire, it would be desirable to completely enclose the anode with a conductive surface and this is accomplished in FIG. 4 by a conductive screen or mesh 17 which extends the inner wall of the counter so that it completely encircles the anode 3 yet which is pervious to X-radiation.

In order to facilitate the transmission of relatively soft X-radiation, the window has been moved to the inner end of the collimator 14 and consists of an outer portion 18 of mylar and an inner portion 19 of very thin beryllium, so thin in fact as to be porous. The construction of this window is described in detail in U.S. Patent 2,665,391.

Figure 5:
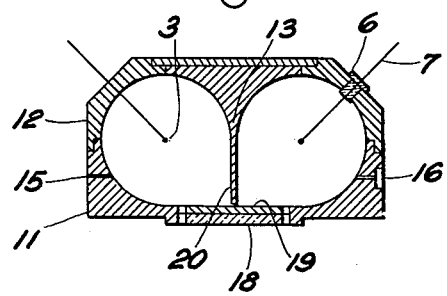
FIG. 5 is a front elevational view, in section, of another embodiment of the counter.

The embodiment shown in FIG. 4 can be modified by extending juncture 13 to form a thin partition 20 as shown in FIG. 5.

Figure 6:
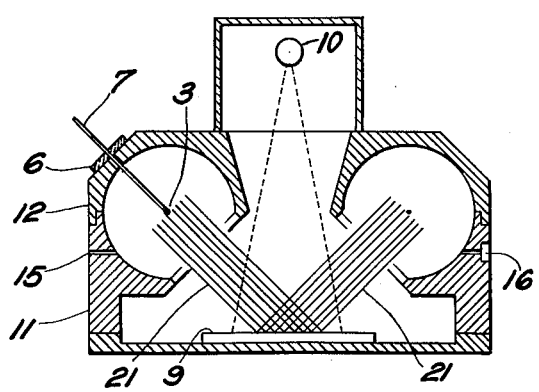
FIG. 6 is a front elevational view, in section, of a preferred embodiment of the counter.

In a further and preferred embodiment of the invention in FIG. 6 the specimen 9 can be mounted entirely within the annular chamber. Primary radiation from source 10, which may be a radioactive material or an X-ray tube enters the counter from either above (as shown) or below the specimen and generates secondary X-rays 21 from elements in the specimen. These secondary X-rays enter the counting region unimpeded by transmission through a window which would stop very soft X-rays. The path length is small enabling detection of the softest X-rays, i.e. X-rays having wave-lengths of the order of 10 or more Angstrom. The detection of such wave-lengths is beyond the capabilities of any presently known instrument.

Figure 7:
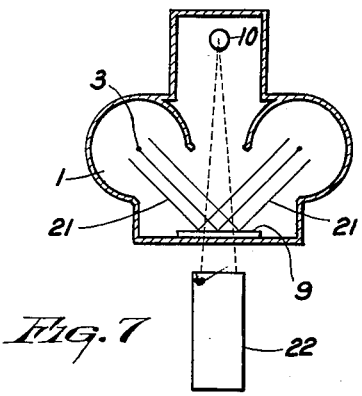
FIG. 7 is a diagrammatic view of a modification of the counter shown in FIG. 6.

FIG. 7 shows, diagrammatically, a modification of the embodiment illustrated in FIG. 6. An auxiliary end-window counter 22 can be employed in combination with the ring counter for measuring the attenuation of primary X-rays in their passage through the specimen.

Figure 8:
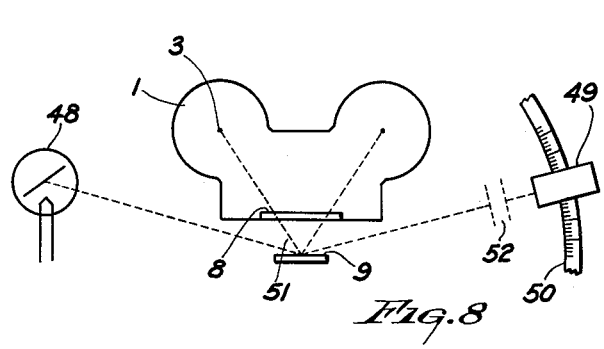
FIG. 8 is a diagrammatic view of a combination of an X-spectrometer and spectrograph employing the counter.

FIG. 8 shows the counter employed in a device serving both as an X-ray spectrograph and as an X-ray spectrometer. Primary X-rays, preferably monochromatic, generated by tube 48 strike specimen 9 generating characteristic secondary X-rays which enter the counter through window 8. The primary X-rays are also diffracted by the specimen and are scanned by a conventional detector 49 mounted on a circular scale 50, or goniometer, and adapted to rotate with the specimen about an axis 51 at twice the angular speed of the specimen. Collimating slits 52 are provided between the detector and the specimen to limit the beam of diffracted X-rays entering the counter. A crystal monochromator (not shown) may be interposed between the specimen and the collimating slits to selectively transmit diffrated X-rays of a particular wave-length.

Figure 9:
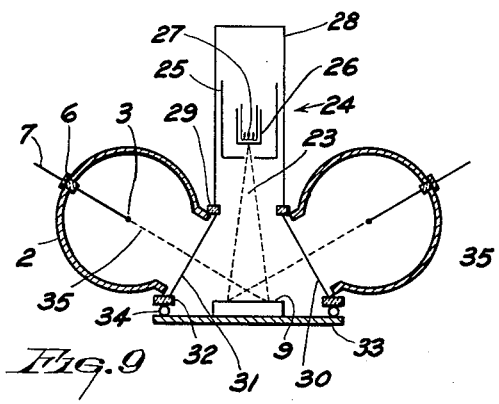
FIG. 9 is a front elevational view of still another embodiment of the spectrograph employing the counter.

FIG. 9 shows still another embodiment in which the specimen is excited by a beam of electrons, in effect making the X-ray source a part of the counter. In this embodiment specimen 9 is exposed to a beam of high-energy electrons 23 generated by an electron gun assembly generally designated 24, which includes an accelerating and focussing electrode 25, a cathode 26 and a heating element 27, surrounded by an envelope 28 sealed in a vacuum tight manner to the inner wall of the annulus by a gasket or sealing ring 29. Since the space in which the electrons travel must be evacuated, windows 30 and 31 seal-off the annulus by being vacuum-tight sealed to the outer wall of the annulus by a gasket or sealing ring 32. The specimen 9 is supported by a wall sealed to the sealing ring by a detachable hermetic seal 34. X-rays 35 generated by electrons enter the counting region through windows 30 and 31.

Figure 10:
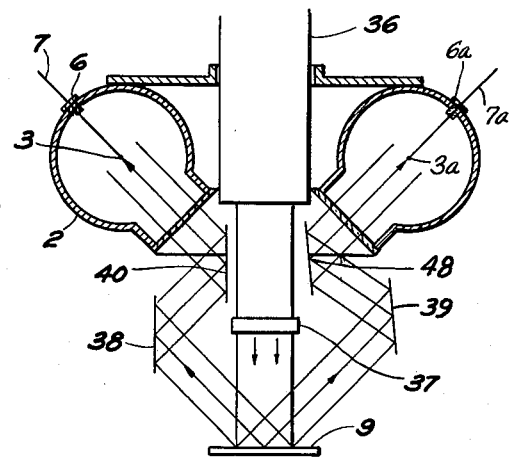
FIG. 10 is a front elevational view of still another embodiment of the spectrograph employing the counter.

In some cases, it may be desirable to selectively filter the secondary radiation from the specimen to facilitate detection of a particular wave-length. A device for accomplishing this purpose is known as an X-ray spectrograph and is employed for detecting the presence of different elements in a specimen of material. FIG. 10 shows such a device adapted to use a ring counter. For example, X-radiation, generated by an X-ray tube 36 is passed through a filter 37 to monochromatize the primary beam of X-radiation. This monochromatized beam generates secondary X-rays of different wavelengths some of which strike reflecting crystals 38 and 39. Since X-rays are reflected in accordance with Bragg's law, X-rays of different wave-lengths will be reflected at different angles and crystals 38 and 39 therefore selectively reflect those wave-lengths which will in turn be reflected by crystals 40 and 48 into the counting chamber. The anode wire 3 may be divided into any desired number of segments, such as segments 3 and 3a, which may be mechanically joined by insulators of the type indicated by reference numeral 4 in FIG. 2. A separate connection wire 7 and 7a would, of course, have to be provided for each of the anode segments 3 and 3a.

Figure 11:
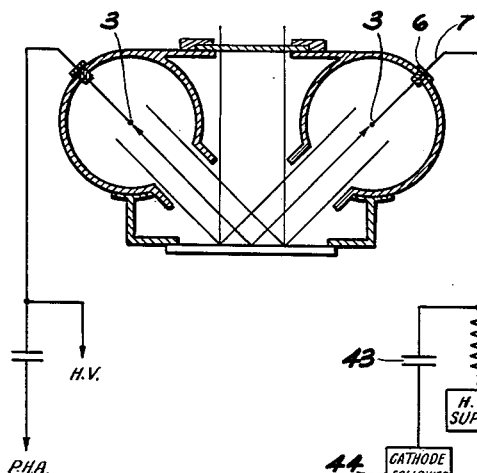
FIG. 11 is a diagrammatic view of a spectrograph employing the counter and its associated circuit elements for detecting elements in a specimen.

FIG. 11 illustrates the principal function of the counter. X-ray quanta entering the counting region ionize the gas causing a discharge between the anode 3 and cathode 2 to occur which gives rise to an electrical pulse. The anode, which consists of a plurality of segments insulated with respect to each other, each of which must be connected to a source of high voltage 41 through a suitable resistance 42. The pulses are separated from the high-voltage D.C. by a decoupling network comprising capacitor 43 and resistor 42. The pulses are transmitted through a conventional cathode follower 44 to a conventional amplifier 45. Amplified pulses are transmitted to conventional pulse height analyzers 46 which measure the heights of the pulses. The pulse height analyzers can be adjusted to selectively transmit pulses of a specified height to counting rate meters 47 which count the number of pulses per unit interval.

It is well-known that at a proper potential between the anode and cathode of a counter, pulses whose amplitudes are proportional to the wave-length of the radiation are produced. The counter is thus operating as a proportional count. By adjusting the pulse height analyzer it is possible to discriminate between pulses of different amplitudes and thereby detect different wave-lengths. Since the wave-length of the radiation is a characteristic of an element in the specimen, it is thus possible to detect the presence of various elements in the specimen.

As is well-known in this art, conventional end-window detectors can conveniently detect radiation of elements having atomic numbers greater than about 22. Below atomic number 22, the wave-length of the characteristic radiation of the element becomes so long that it is absorbed almost entirely in air before it reaches the detector. If the path between the specimen and the detector is enclosed and evacuated, a thicker window is necessary and the window absorbs the radiation. If the path is filled with helium, some contamination of the counter gas may result if the window is sufficiently thin and some absorption in the path occurs. Nevertheless, it has been possible by this latter method to detect the element magnesium, whose characteristic K wave-length is about 9.5 A. This would appear to be the lower limit for this type of counter.

It is a special feature of this invention that helium is used as the counter gas with isopropyl alcohol as the quenching agent. Placing the specimen within the counter eliminates the window and drastically shortens the path between the specimen and counting region. Consequently, the efficiency of the detector is increased measurably, particularly for the elements of atomic number less than 20 and in the period of the periodic table below 10. Vast possibilities are opened up for important discoveries regarding materials containing the elements boron, carbon, nitrogen and oxygen which defy X-ray analysis.

Figure 12:
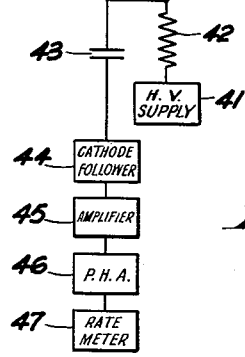
FIG. 12 is a graph showing response curves for high and low number atomic elements for the counter.
Figure 12:
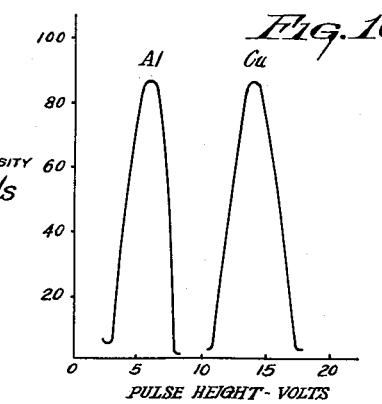

FIG. 12 shows a comparison in the counting efficiency of the counter for the elements copper and aluminum. Copper is atomic number 29 and has K-wave-length of about 1.38 A. Conventional detectors have no difficulty detecting this element. Aluminum is atomic number 13 and has a K-wave-length of about 8.0 A. This element can only be detected with a helium path detector and somewhat inefficiently.

Referring to FIG. 12, the counter according to the invention shows true proportional counting character for both elements present in samples. The ordinates represent the number of counts recorded per second—about 85—while the abscissae show the average pulse height which is proportional to wave-length. No difficulty is realized in detecting aluminum or discriminating it from other elements.

While we have thus described our invention with specific examples and embodiments thereof, we do not wish to be limited thereby since other embodiments will be apparent to those skilled in the art. The invention is defined and pointed out with particularity in the appended claims which should be construed as broadly as possible in view of the art.

What we claim is:

1. A detector for X-radiation comprising an enclosure defining a toroidal discharge space, an ionizable medium within said discharge space, an anode electrode concentric with and centrally disposed within said discharge space, a cathode electrode surrounding said anode and concentric therewith, and means to apply a potential between the anode and cathode electrodes, the wall of said enclosure having edges defining an opening inwardly inclined at an angle toward the axis of the toroidal discharge space to permit X-rays to enter said discharge space with a minimum hindrance.

2. A detector for X-radiation comprising an enclosure having an electrically conductive inner wall defining a toroidal discharge space, an ionizable medium within said discharge space, an anode electrode concentric with and centrally disposed within said discharge space, means to support the anode from the wall of said enclosure and electrically insulate it therefrom, and means to apply a potential between the anode and the inner wall of said enclosure, the wall of said enclosure having edges defining an opening inwardly inclined at an angle toward the axis of the toroidal discharge space to permit X-rays to enter said discharge space with a minimum hindrance.

3. A detector for X-radiation comprising an enclosure defining a toroidal discharge space, a partition element interrupting said annular discharge space, an ionizable medium within said discharge space, an anode electrode concentric with and centrally disposed within said discharge space and spaced from said partition element, a cathode electrode surrounding said anode and concentric therewith, and means to apply a potential between the anode and cathode electrodes, the wall of said enclosure having edges defining an opening inclined inwardly at an angle toward the axis of the toroidal discharge space to permit X-rays to enter said discharge space with a minimum hindrance, and a thin partition element covering said window, said element being permeable to low-frequency X-rays.

4. A detector for X-radiation comprising an enclosure defining a toroidal chamber, wire-mesh members closing said annular chamber on either side of a plane passing through an axis of said annular chamber thereby defining a partially toroidal enclosure, an ionizable medium within said discharge space, an anode electrode concentric with and centrally disposed within said toroidal enclosure, a cathode electrode surrounding said anode and concentric therewith forming a discharge space, means to apply a potential between the anode and cathode electrodes, the wall of said enclosure having edges defining an opening inclined inwardly at an angle toward the axis of the toroidal discharge space to permit X-rays to enter said discharge space with a minimum hindrance, and a wire-mesh member covering said opening to provide substantially uniform potential distribution within said discharge space.

5. A detector for X-radiation comprising an enclosure defining a toroidal discharge space, an ionizable medium within said discharge space, an anode electrode concentric with and centrally disposed within said discharge space, a cathode electrode surrounding said anode and concentric therewith, means to apply a potential between the anode and cathode electrodes, and means to replenish the supply of ionizable medium in said discharge space, the wall of said enclosure having edges defining an opening inwardly inclined at an angle toward the axis of the toroidal discharge space to permit X-rays to enter said discharge space with a minimum hindrance.

6. A detector for X-radiation comprising an enclosure defining a toroidal discharge space, an ionizable medium within said discharge space, an anode electrode concentric with and centrally disposed within said discharge space, means to apply a potential between said anode and the wall of said enclosure, means to dispose a specimen within said enclosure, and means to generate X-rays from said specimen which are detected in said discharge space, the wall of said enclosure having edges defining an opening inwardly inclined at an angle toward the axis of the toroidal discharge space to permit X-rays to enter said discharge space with a minimum hindrance.

7. A detector for X-radiation comprising an enclosure defining a toroidal discharge space, an ionizable medium within said discharge space, an anode electrode concentric with and centrally disposed within said discharge space, means to apply a potential between said anode and the wall of said enclosure, the wall of said enclosure having edges defining an X-ray pervious window inclined inwardly at an angle toward the axis of the toroidal discharge space, and means to dispose a specimen within said discharge space and located for exposure to X-rays passing through said window whereby said specimen is caused to fluoresce and emit characteristic secondary X-rays into said discharge space.

8. A detector for X-radiation comprising an enclosure defining a toroidal discharge space, an ionizable medium within said discharge space, an anode electrode concentric with and centrally disposed within said discharge space, means to apply a potential between said anode and the wall of said enclosure, means to generate X-rays within said enclosure, and means to dispose a specimen within said enclosure for exposure to said X-rays whereby said specimen is caused to fluoresce and generate characteristic secondary X-rays which are detected in said discharge space, the wall of said enclosure having edges defining an opening inclined inwardly at an angle toward the axis of the toroidal discharge space, said specimen being located on said axis in the region toward which said window faces.

9. A detector for X-radiation comprising an enclosure defining a toroidal discharge space, an ionizable medium within said discharge space, an anode electrode concentric with and centrally disposed within said discharge space, means to apply a potential between said anode and the wall of said enclosure, a specimen within said enclosure means within said enclosure to generate a beam of electrons, and means within said enclosure to apply a potential to said specimen and exposing the same to said electron beam whereby said specimen is excited into generating X-rays, the wall of said enclosure having edges defining a window inclined inwardly at an angle toward the axis of the toroidal discharge space, and means covering said window and pervious to X-rays separating said discharge space from said electron beam generating means and said specimen whereby X-rays generated by said specimen are detected in said discharge space.

10. A detector for X-radiation comprising an enclosure defining a toroidal discharge space, an ionizable medium within said enclosure, an anode electrode concentric with and centrally disposed within said discharge, means to apply a potential between said anode and the wall of said enclosure means to dispose a specimen within said enclosure, means to generate X-rays from said specimen, and means to select X-rays of a single wave-length emerging from said specimen and transmit the same into said discharge space, the wall of said enclosure having edges defining an opening inclined inwardly at an angle toward the axis of the toroidal discharge space to permit X-rays of a single wave-lenth to enter said discharge space with a minimum hindrance.

11. A detector for X-radiation comprising an enclosure defining a toroidal discharge space, an ionizable medium within said discharge space, an anode electrode concentric with and centrally disposed within said enclosure, means to apply a potential between said anode and the wall of said enclosure, the wall of said enclosure having edges defining a window inclined inwardly at an angle toward the axis of the toroidal discharge space, means pervious to X-rays defining with the wall of said enclosure a conical chamber separated from the discharge space, means to dispose a specimen within said conical chamber on said axis in the region thereof toward which said window faces, and means within said conical chamber for generating and directing at said specimen a beam of electrons of sufficient intensity to generate X-rays.

12. A detector for X-radiation comprising an enclosure defining a toroidal discharge space, the wall of said enclosure having edges defining an opening inclined inwardly at an angle toward the axis of the toroidal discharge space, an ionizable medium within said discharge space, an anode electrode concentric with and centrally disposed within said enclosure, means to apply a potential between said anode and the wall of said enclosure, means to dispose a specimen within said discharge space on said axis in the region thereof toward which said window faces, and means to generate X-rays from said specimen.

13. An X-ray spectrograph comprising, in combination, a source of penetrating radiation adapted to generate characteristically X-rays from elements within a specimen, an enclosure defining a toroidal discharge space, the wall of said enclosure having edges defining an opening inclined inwardly at an angle toward the axis of the toroidal discharge space, an ionizable medium within said discharge space, an anode electrode concentric with and centrally disposed within said discharge space, a cathode electrode surrounding said anode electrode and concentric therewith, means to support said specimen within said enclosure on said axis in the region thereof toward which said window faces, means to expose said specimen to said penetrating radiation without substantially introducing the penetrating radiation into the discharge space, means to apply a suitable potential between said cathode and anode electrodes to produce electrical pulses proportional to the amplitudes of the wave-lengths of the X-radiation generated by said specimen, and means to measure the amplitudes of the pulses thus produced to thereby determine the elemental composition of said specimen.

14. An X-ray spectrograph comprising, in combination, a source of penetrating radiation adapted to generate characteristic X-rays from elements within a specimen, an enclosure defining a toroidal discharge space, the wall of said enclosure having edges defining an opening inclined inwardly at an angle toward the axis of the toroidal discharge space, an ionizable medium within said discharge space, an anode electrode concentric with and centrally disposed within said discharge space, a cathode electrode surrounding said anode electrode and concentric therewith, means to support said specimen within said enclosure on said axis in the region thereof toward which said window faces, means to expose said specimen to the penetrating radiation without substantially introducing the penetrating radiation into said discharge space, means to apply a suitable potential between the cathode and anode electrodes to produce electrical pulses proportional to the wave-lengths of the X-radiation produced by elements in said specimen and entering said discharge space, means between the specimen and the discharge space to selectively introduce X-radiation of one wave-length into said discharge space, means to detect the pulses thus produced, and means to measure the thus produced pulses.

References Cited in the file of this patent

UNITED STATES PATENTS

| | | |
|---|---|---|
| 2,288,718 | Kallmann | July 7, 1942 |
| 2,340,967 | Langer | Feb. 8, 1944 |
| 2,398,934 | Hare | Apr. 23, 1946 |
| 2,458,093 | Muskat | Jan. 4, 1949 |
| 2,590,925 | Borkowski | Apr. 1, 1952 |
| 2,694,152 | Teichmann | Nov. 9, 1954 |
| 2,769,911 | Warmoltz | Nov. 6, 1956 |
| 2,837,656 | Hendee | June 3, 1958 |